(12) United States Patent
Mun et al.

(10) Patent No.: US 7,652,401 B2
(45) Date of Patent: Jan. 26, 2010

(54) FLAT VIBRATION MOTOR

(75) Inventors: Byung Hee Mun, Gwangjoo-shi (KR); Jae Jun Eom, Gwangjoo-shi (KR)

(73) Assignee: LG Innotek Co., Ltd., Seoul (KR)

( * ) Notice: Subject to any disclaimer, the term of this patent is extended or adjusted under 35 U.S.C. 154(b) by 89 days.

(21) Appl. No.: 11/720,235

(22) PCT Filed: Feb. 3, 2006

(86) PCT No.: PCT/KR2006/000394

§ 371 (c)(1),
(2), (4) Date: May 25, 2007

(87) PCT Pub. No.: WO2006/083128

PCT Pub. Date: Aug. 10, 2006

(65) Prior Publication Data

US 2008/0129130 A1   Jun. 5, 2008

(30) Foreign Application Priority Data

Feb. 7, 2005   (KR) ............... 10-2005-0011231
Feb. 7, 2005   (KR) ............... 10-2005-0011232
Feb. 7, 2005   (KR) ............... 10-2005-0011234

(51) Int. Cl.
*H02K 7/065* (2006.01)
*H02K 7/075* (2006.01)

(52) U.S. Cl. ............ 310/71; 310/207; 310/81; 310/261.1; 310/87; 310/216.001

(58) Field of Classification Search .......... 310/71, 310/81, 261, 216, 87
See application file for complete search history.

(56) References Cited

U.S. PATENT DOCUMENTS

| | | | | |
|---|---|---|---|---|
| 4,433,259 A | * | 2/1984 | Okamura | 310/89 |
| 4,494,026 A | * | 1/1985 | Abe | 310/89 |
| 5,410,789 A | * | 5/1995 | Noto et al. | 29/25.35 |
| 6,600,245 B1 | * | 7/2003 | Yang et al. | 310/71 |
| 6,621,188 B2 | | 9/2003 | An et al. | |
| 7,352,093 B2 | | 4/2008 | Kim | |
| 2006/0138885 A1 | * | 6/2006 | Uchiumi et al. | 310/81 |

FOREIGN PATENT DOCUMENTS

| | | |
|---|---|---|
| CN | 1350715 A | 5/2002 |
| CN | 1447494 A | 10/2003 |
| KR | 1998-040061 | 9/1998 |

* cited by examiner

*Primary Examiner*—Quyen Leung
*Assistant Examiner*—Terrance Kenerly
(74) *Attorney, Agent, or Firm*—Saliwanchik, Lloyd & Saliwanchik

(57) ABSTRACT

A flat vibration motor is provided. The flat vibration motor includes a rotor portion, a stator portion, a fixing mount, a pair of terminals, and a base portion. The rotor portion generates vibrating force when rotating. The stator portion houses and couples with the rotor portion to allow the rotor portion to rotate. The fixing mount extends from a side of a lower case of the stator portion. Each terminal includes a contacting portion, an elastic portion, and a joining portion. The base portion forms a plurality of supporting holes through which each of the terminals respectively passes. The joining portion of the terminal connects electrically to the circuit board through a peripheral lower surface around the supporting hole, when the base portion and the fixing mount are coupled.

20 Claims, 6 Drawing Sheets

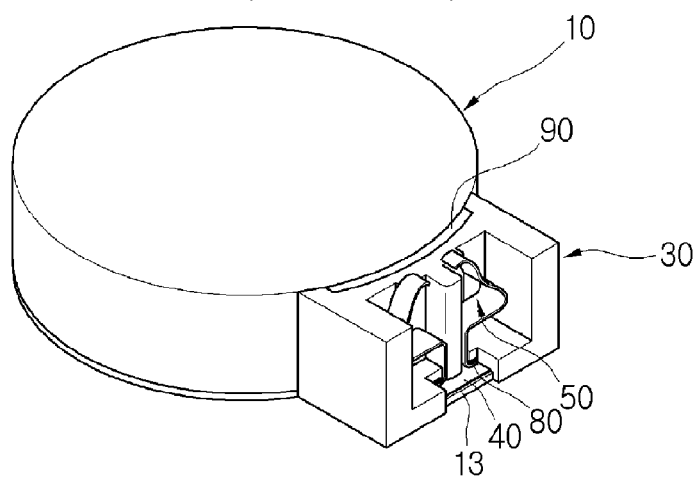
[Fig. 1] (Related Art)
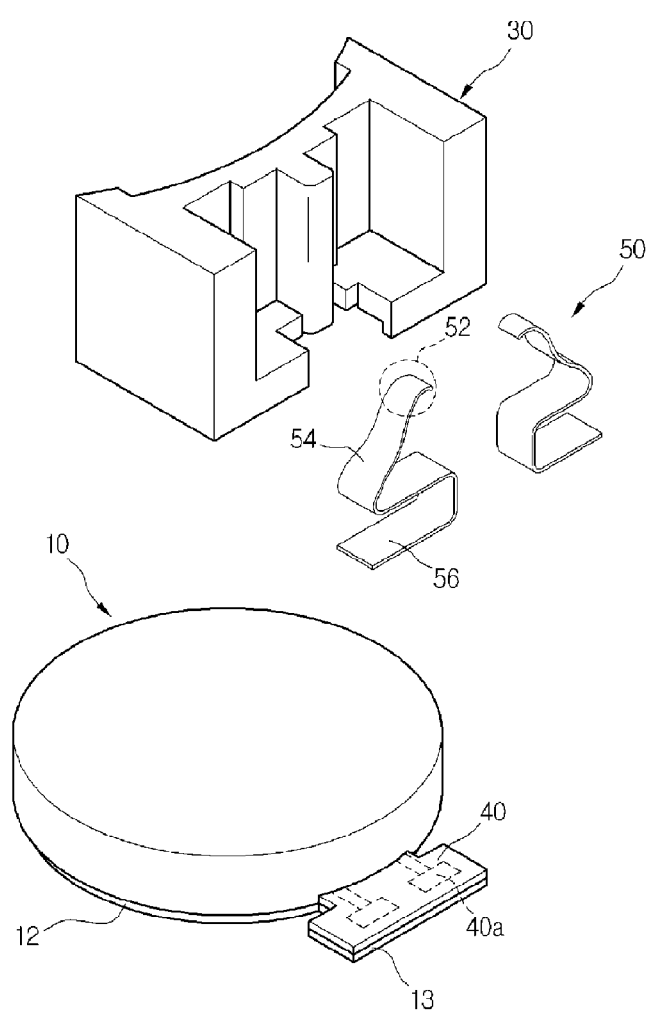
[Fig. 2] (Related Art)

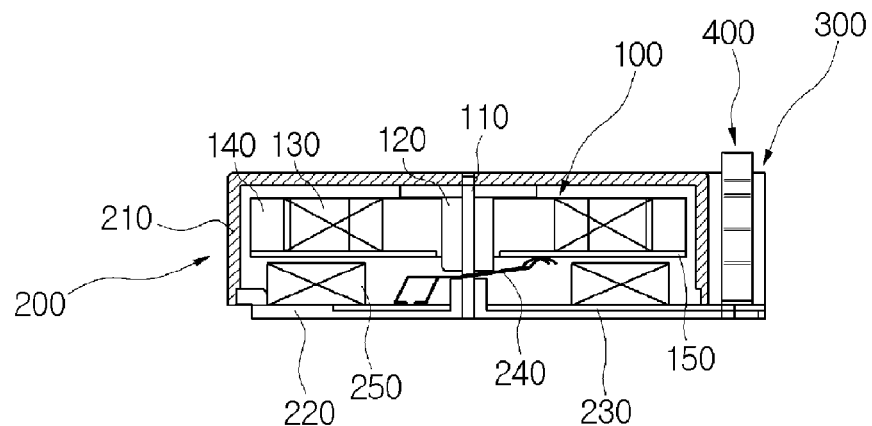
[Fig. 3]
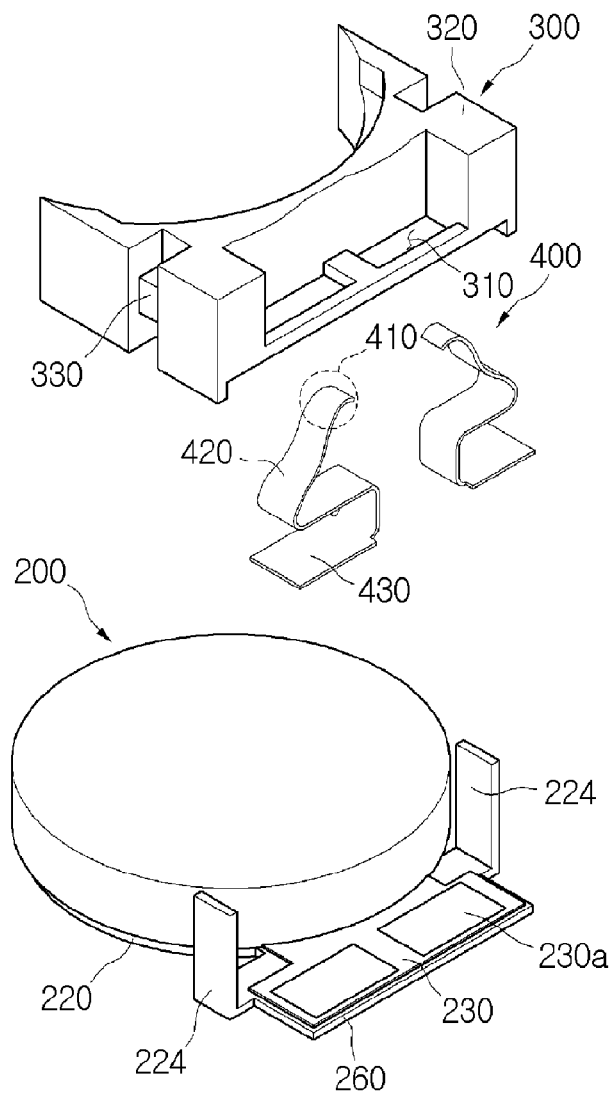
[Fig. 4]

[Fig. 5]
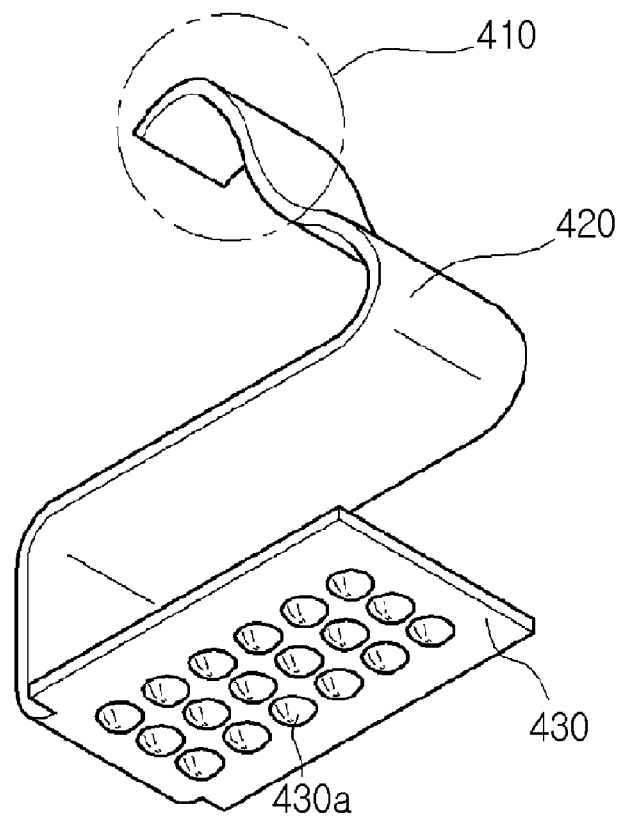
[Fig. 6]
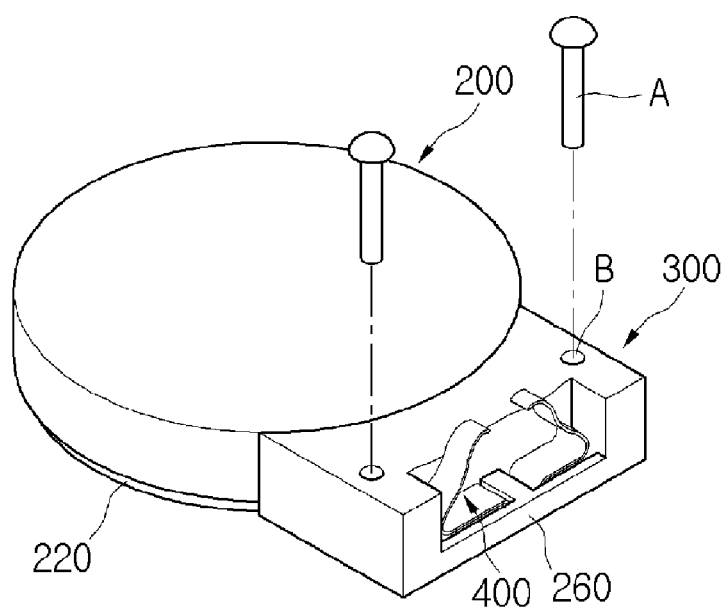

[Fig. 7]
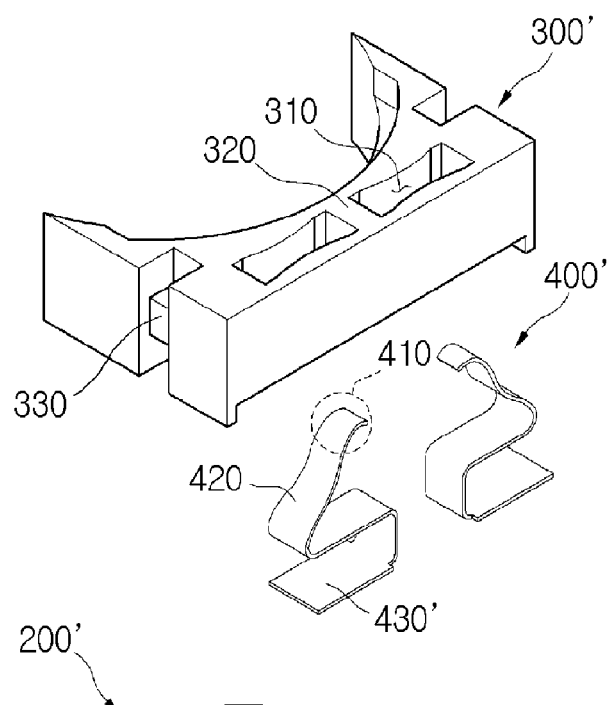
[Fig. 8]
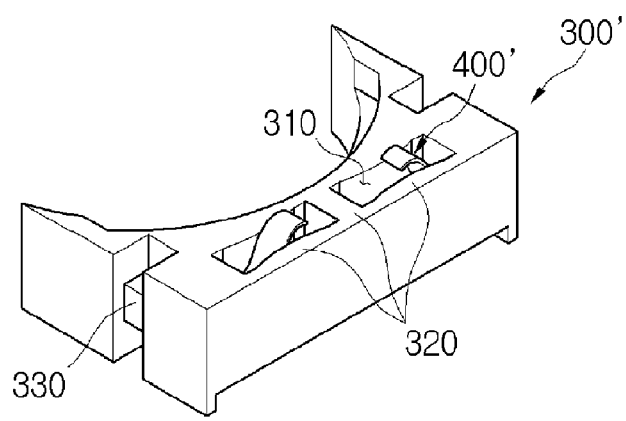

[Fig. 9]
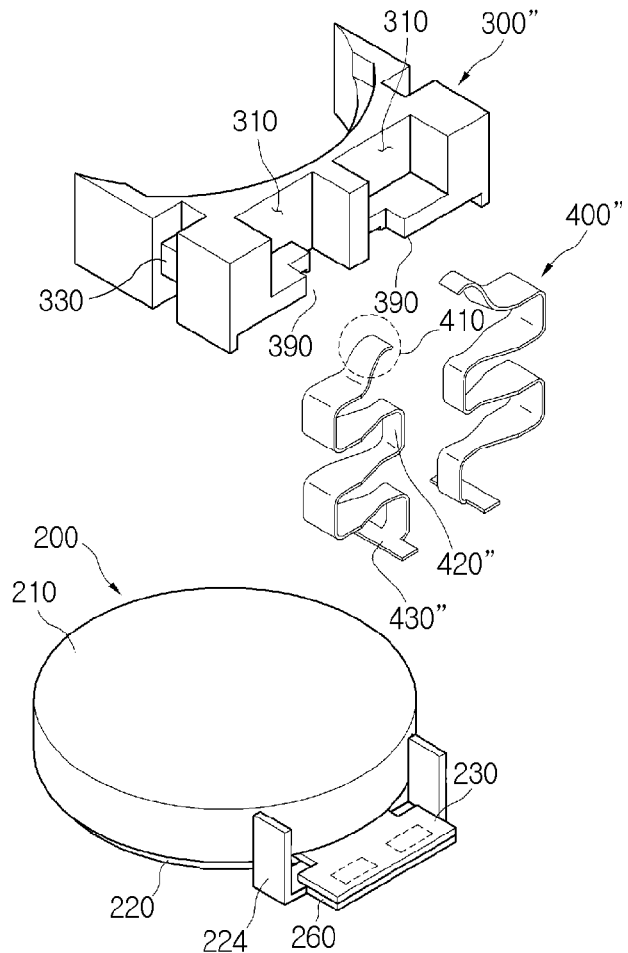
[Fig. 10]
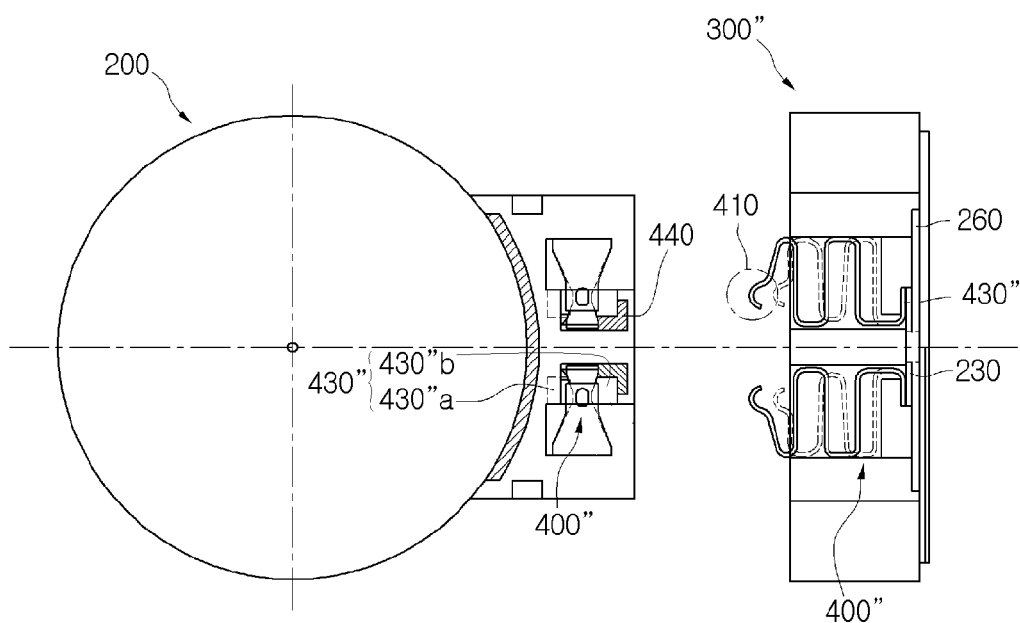

[Fig. 11]
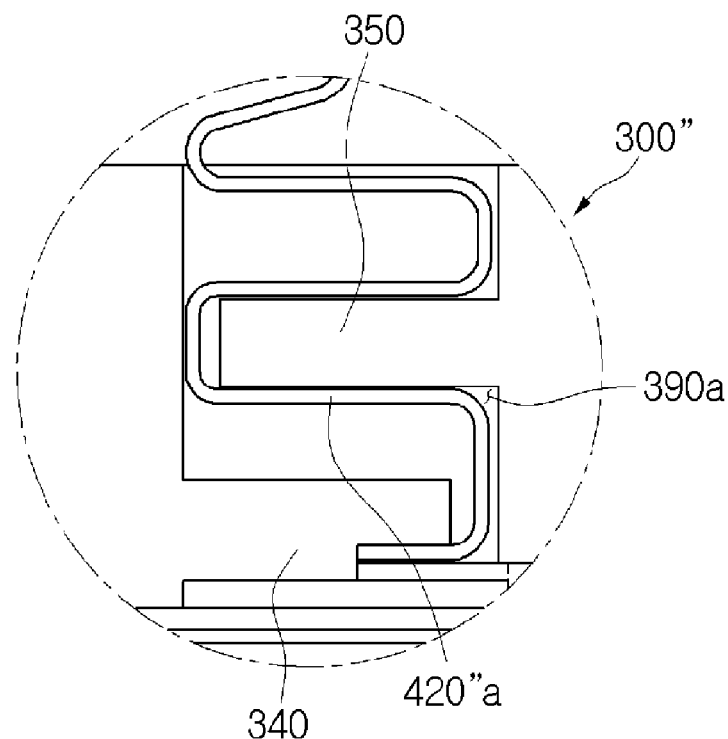
[Fig. 12]
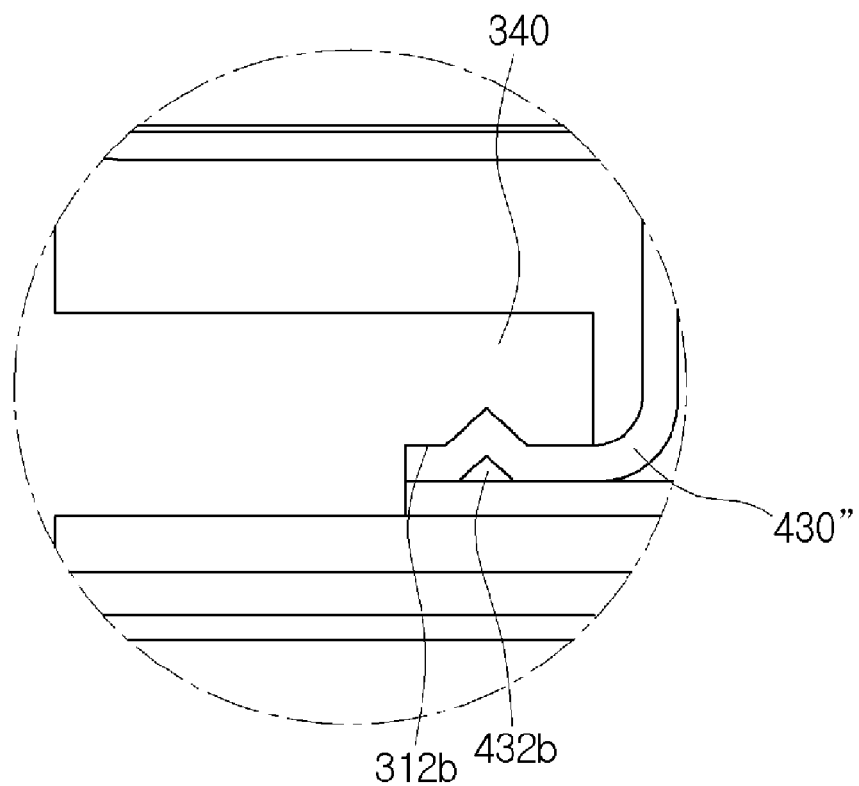

FLAT VIBRATION MOTOR

CROSS-REFERENCE TO RELATED APPLICATION

This application is the U.S. national stage application of International Patent Application No. PCT/KR2006/000394, filed Feb. 3, 2006, the disclosure of which is hereby incorporated by reference in its entirety, including all figures, tables and amino acid or nucleic acid sequences.

TECHNICAL FIELD

The present invention relates to a vibration motor, and more particularly, a flat vibration motor.

BACKGROUND ART

A flat vibration motor is a miniature motor that can be installed in cellular phones, smart phones, personal digital assistants (PDA), and similar mobile telecommunication terminals and various other electronic devices. When a signal is received from a call center, a flat vibration motor can alert a user of an incoming call through vibrations instead of sound.

More specifically, when set in "manner mode", a mobile telecommunication terminal transmits vibrations through the operating of such a flat vibration motor.

A flat vibration motor is coin-sized and generates a strong vibrating force, so that it requires a relatively durable coupling structure. However, its terminals are often deformed due to the strong vibrating force, so that the contact points are altered.

FIG. 1 is a perspective view of a flat vibration motor according to the related art.

Referring to FIG. 1, a flat vibration motor according to the related art includes a stator portion 10, a rotor portion (inside the stator portion), and a base portion 30.

The stator portion 10 forms a housing within which the rotor portion is rotatably disposed, so that vibrating force imparted by the rotor portion can be transmitted to the outside. Also, the stator portion 10 has a second circuit board 40 for transmitting electricity to the rotor portion, and a fixing mount 13 extending from a side thereof. Here, the second circuit board 40 is supported by the fixing mount 13 on the stator portion 10.

The base portion 30 has a terminal 50 through which electricity is transmitted from an external source, and is coupled to the stator portion 10. The terminal 50 is connected to the second circuit board 40 on the fixing mount 13.

In further detail, the bottom part of the terminal 50 is fixed with solder 80 between the bottom surface of the base portion 30 and the second circuit board 40 on the fixing mount 13.

The base portion 30 is coupled to the stator portion 10 with an adhesive 90.

Here, after the base portion 30 is assembled, during the fixing process of the terminal 50 to the second circuit board 40 using solder 80, many problems can arise.

The terminal 50 is fixed at its lower portion with solder 80 to the second circuit board 40, while its remainder is exposed to the outside. Accordingly, when the terminal 50 is subjected to external forces during manufacturing or load while being installed on a device such as a mobile telecommunication terminal, the solder 80 portion of the terminal 50 can be deformed or detached, resulting in an altering of the contact point between the terminal 50 and an external terminal.

When even a slight force is applied when the solder has not hardened, the coupled region can easily be deformed. Liquid solder can be deposited by a solder iron during the soldering process on other regions of the flat vibration motor. In these two cases, a faulty contact problem between terminals can occur. Additionally, the outer appearance of the product is compromised giving the impression of inferior quality.

Also, the base portion 30 can be deformed or burnt by excess heat that is generated during the soldering process, impeding efforts to lower product defect rates.

Moreover, the base portion 30 and the stator portion 10 that are coupled with the adhesive 90 may become loose or disengage due to ineffectiveness of the adhesive 90 or a from an externally-applied shock, such as one from a user dropping the mobile telecommunication terminal.

When such a problem of coupling the stator portion 10 and the base portion 30 occurs, it can induce a problem in the connection between the terminal 50 and the circuit board 40, and disrupt the supply of electricity.

FIG. 2 is an exploded perspective view showing a disassembled state of the base portion 30 and terminals 50 from the stator portion of the flat vibration motor in FIG. 1.

Referring to FIG. 2, the fixing mount 13 is in the form of a rectangular plate extending from a side of the lower case 12, and the second circuit board 40 is disposed on the top surface of the fixing mount 13.

The terminal 50 is formed of a contacting portion 52, an elastic portion 54, and a joining portion 56. The joining portion 56 is inserted and fixed between the second circuit board 40 and the base portion 30, and is soldered and coupled to a conducting portion 40a of the second circuit board 40.

However, with only the joining portion 56 of the terminal 50 fixed (as shown in FIG. 2), the elastic portion 54 and the contacting portion 52 are not supported by a wall of the base portion 30 and are exposed to the outside. Therefore, when the terminal 50 is compressed, it lacks support or protection from external forces.

When a flat vibration motor with the above-described structure is installed in a device such as a mobile telecommunication terminal, the contacting portion 52 contacts a power terminal of the device to be supplied with power. Here, the contacting portion 52 and the elastic portion 54 generate a certain amount of pressure at the joining portion on the power terminal.

However, because the elastic portion 54 cannot be supported on all four sides, if a load is applied in a predetermined direction on the elastic portion 54, it is prone to warp or permanently compress, altering a contacting position with a power terminal of a mobile telecommunication terminal. In this case, during product manufacturing, assembly defects can occur.

Additionally, when the terminal 50 is unable to withstand a certain amount of pressure and is deformed in the direction of the open side of the base, its elasticity decreases, so that cannot maintain an adequate pressure for contacting an external terminal.

Furthermore, a flat vibration motor according to the related art has somewhat complex manufacturing and assembling processes.

DISCLOSURE OF INVENTION

Technical Problem

To solve these problems, the present invention provides a flat vibration motor that allows easy assembly of a base portion, terminal, and stator portion.

Furthermore, the flat vibration motor according to the present invention firmly couples the base portion and the stator portion in order to prevent deformation of the terminal.

Additionally, the flat vibration motor according to the present invention uses a mechanical structure for coupling the base portion and the stator portion, so that the terminal and a circuit board are reliably connected to conduct electricity.

Moreover, the flat vibration motor according to the present invention provides an improved supporting structure of the base portion for preventing deforming of an elastic portion of the terminal.

Also, the flat vibration motor according to the present invention provides a structure that facilitates assembly of the base portion and the terminal, while maintaining a contacting point between the terminal and an external terminal.

Technical Solution

To achieve the above objects, there is provided a flat vibration motor comprising: a rotor portion for generating vibrating force when rotating; a stator portion housing and coupled with the rotor portion to allow the rotor portion to rotate, the stator portion for transmitting electricity; a fixing mount extending from a side of a lower case of the stator portion for supporting a part of a circuit board thereon; a pair of terminals, each terminal including a contacting portion contacted with an external terminal, an elastic portion for providing elasticity to the contacting portion, and a joining portion formed wider than the contacting portion and the elastic portion for electrically connecting to the circuit board; and a base portion including a plurality of supporting holes through which each the contacting portion and the elastic portion of the terminals respectively passes, and coupled with the fixing mount and the stator portion, wherein the joining portion of the terminal connects electrically to the circuit board through a peripheral lower surface around the supporting hole, when the base portion and the fixing mount are coupled.

According to another aspect of the present invention, there is provided a flat vibration motor including: a rotor portion for generating vibrating force when rotating; a stator portion housing and coupled with the rotor portion for allowing the rotor portion to rotate, the stator portion for transmitting electricity; a fixing mount extended from a side of a lower case of the stator portion for supporting a part of a circuit board thereon; a pair of terminals, each terminal including a joining portion electrically connected to a portion of the circuit board, a contacting portion contacted with an external terminal, and an elastic portion formed between the contacting portion and the joining portion for providing elasticity; and a base portion coupled to the fixing mount and the stator portion, the base portion including a plurality of supporting holes for guiding an elastic deformation of the respective terminals when the terminals are inserted therein.

According to a further aspect of the present invention, there is provided a flat vibration motor including: a rotor portion for generating vibrating force when rotating; a stator portion coupled with the rotor portion for allowing the rotor portion to rotate; a fixing mount extended from a side of a lower case of the stator portion for supporting a part of a circuit board thereon; a terminal including a joining portion coupled to the circuit board, a contacting portion contacted with an external terminal, and an elastic portion formed between the contacting portion and the joining portion for providing elasticity; and a base portion coupled with the fixing mount and the stator portion, and supporting the terminal, wherein the base portion includes a stepped space for inserting at least a part of the joining portion therein, and the joining portion is soldered to the circuit board after the part thereof is inserted into the stepped space.

Advantageous Effects

An advantage of the flat vibration motor according to the present invention is that it employs a mechanical joining structure to reliably connect the terminal and the circuit board electrically, preventing deformation of the base portion, contact failure, environmental pollution, and other adverse effects.

Also, the flat vibration motor according to the present invention supports its terminal with the inner walls of a supporting hole and guides the terminal in only a vertical direction (in which the terminal is elastic), to allow for compression and decompression to reliably maintain the contacting position of the terminal, so that wobbling or deformation of the terminal is prevented when it is subjected to lateral pressure, shock, or excessive compression.

Furthermore, the flat vibration motor according to the present invention also maintains a consistent distance between terminals and between the center of the motor and a terminal.

Additionally, the flat vibration motor according to present invention supports a terminal before it reaches a changing point in its elasticity, preventing deformation of the terminal due to excessive compression thereof when in contact with an external terminal, so that a contact point is reliably maintained.

Moreover, the flat vibration motor according to the present invention allows easy assembly of the base portion, terminal, and stator to simplify the assembly process, reduce cost, and increase production.

BRIEF DESCRIPTION OF THE DRAWINGS

The spirit of the present invention can be understood more fully with reference to the accompanying drawings. In the drawings:

FIG. 1 is a perspective view of a flat vibration motor according to the related art;

FIG. 2 is an exploded perspective view showing a disassembled state of the base portion and terminals from the stator portion of the flat vibration motor in FIG. 1;

FIG. 3 is a schematic sectional view showing an internal structure of a flat vibration motor according to an embodiment of the present invention;

FIG. 4 is an exploded perspective view showing the assembly of the base portion, the terminals, and the stator portion of a flat vibration motor according to the first embodiment of the present invention;

FIG. 5 is a perspective view of a terminal showing the embossing formed on a bottom surface thereof according to the first embodiment of the present invention;

FIG. 6 is a perspective view of a flat vibration motor according to the first embodiment of the present invention employing rivet connecting;

FIG. 7 is an exploded perspective view showing the assembly of the base portion, the terminals, and the stator portion of a flat vibration motor according to the second embodiment of the present invention;

FIG. 8 is a perspective view showing the base portion coupled with the terminals of a flat vibration motor according to the second embodiment of the present invention;

FIG. 9 is an exploded perspective view showing the assembly of the base portion, the terminals, and the stator portion of a flat vibration motor according to the third embodiment of the present invention;

FIG. 10 is a plan view and a vertical view showing the assembly of the base portion, terminals, and fixing mount of a flat vibration motor according to the third embodiment of the present invention;

FIG. 11 is an enlarged side view showing an assembling structure of the base portion, a terminal, and a fixing mount of a flat vibration motor according to the third embodiment of the present invention; and FIG. 12 is an enlarged side view showing another assembling structure of the base portion, a terminal, and a fixing mount of a flat vibration motor according to the third embodiment of the present invention are assembled.

BEST MODE FOR CARRYING OUT THE INVENTION

Hereinafter, preferred embodiments of a flat vibration motor according to the present invention will be described in detail with reference to the accompanying drawings.

FIG. 3 is a schematic sectional view showing an internal structure of a flat vibration motor according to an embodiment of the present invention.

A flat vibration motor, according to one embodiment of the present invention, includes a rotor portion 100, a stator portion 200, and a base portion 300. The rotor portion 100 includes a coil 130, a vertical portion 140, and a first circuit board 150. The stator portion 200 includes an upper case 210, a lower case 220, a second circuit board 230, a brush 240, and a permanent magnet 250. The base portion 300 includes a terminal 400.

The shaft 110 is fixed to the lower case 220 and provides a central axis around which the rotor 100 rotates. A bearing 120 is interposed between the shaft 110 and the rotor 100.

The first circuit board 150 is electrically connected to the coil 130, contacting the brush 240 through a commutator (not shown) to transmit electricity to the coil 130.

In this structure, the rotor 100, with an eccentric load, rotates within the stator 200 to generate vibrating force. To create the eccentric load, the rotor 100 may include an unbalancing member or may be formed to revolve asymmetrically around the rotational axis.

The second circuit board 230 is electrically connected to the terminal 400 on the base 300 and the brush 240.

The permanent magnet 250 is donut-shaped and is disposed on the lower case 220 to generate magnetic repulsion with the coil 130.

The base portion 300 includes the terminal 400 and supplies electricity to the flat vibration motor according to embodiments of the present invention. The terminal 400 may be provided in plurality according to embodiments of the present invention.

First Embodiment

A detailed description of a flat vibration motor according to the first embodiment of the present invention will be given below with reference to the diagrams.

FIG. 4 is an exploded perspective view showing how the base portion 300, the terminals 400, and the stator portion 200 of a flat vibration motor according to the first embodiment of the present invention are assembled.

Referring to FIG. 4, a fixing mount 260, for supporting the base portion 300, is formed on a side of the lower case 220 of the stator portion 200.

The fixing mount 260 is rectangular plate with a second circuit board 230 disposed on a top surface thereof.

The terminal 400 includes a contacting portion 410, an elastic portion 420, and a joining portion 430. In the first embodiment of the present invention, the terminal 400 is provided in duplicate, and the two terminals are symmetrically opposed to one another on the second circuit board 230. However, an alternate number of terminals 400 may be provided.

The joining portion 430 of the terminal 400 is attached to a conducting portion 230a formed on the upper surface of the exposed portion of the second circuit board 230, and contacting portion 410 contacts a power terminal of a mobile telecommunication terminal if the motor is installed in the mobile telecommunication terminal.

The edges of the joining portion 430 are extended so that the joining portion 430 has a greater width than those of the contacting portion 410 or the elastic portion 420.

The elastic portion 420 is formed between the contacting portion 410 and the joining portion 430, and provides elasticity. To provide elasticity the terminal 400 may be made of tensile metal.

The terminal 400 may be a connector-type, spring-type, or one of various other types.

The base 300 may have a supporting hole 310 formed respectively for inserting each terminal 400 therein.

The supporting hole 310 according to the first embodiment may be formed in plurality, in which case, the supporting holes 310 are separated from each other and firmly support the terminals 400 by means of their inner supporting walls 320.

The supporting hole 310 may be provided in duplicate in the first embodiment, or in an alternate number corresponding to the number of terminals 400 provided.

The elastic portion 420 and the connecting portion 410 of the terminal 400 pass through the supporting hole 310, and at least the connecting portion 410 from the two portions is exposed towards the top of the base portion 300. The contacting portion 430 of the terminal 400 catches on the bottom of the base portion 300. More specifically, the extended ends of the contacting portion 430 catch on the periphery of the base portion 300 forming the supporting hole 310.

Accordingly, when the base 300 is coupled to the fixing mount 260, both extended ends of the contacting portion 430 of the terminal 400 press against the periphery of the supporting hole 310, so that the terminal 400 is firmly connected to the second circuit board 230.

In addition, a groove having fixing ledge 330 is formed on each side of the base portion 300, so that a fixing arm 224 formed on each end of the fixing mount 260 is disposed opposite to the fixing ledge 330.

Here, the number of the fixing ledge 330 and the fixing arm 224 and their shapes may vary, and are respectively provided in duplicate on the base portion and the fixing mount 260 in rectangular forms in the first embodiment.

The second circuit board 230, the terminal 400, and the base portion 300 are sequentially positioned on the fixing portion 260, and the end portion of the fixing arm 224 is permanently bent upwards towards the top of the fixing ledge 330, so that the base portion 300 is coupled with the fixing mount 260.

In addition to this mechanical coupling of the base portion 300 and fixing mount 260, the base portion 300 is also attached to the stator portion 200 by means of an adhesive applied therebetween, for an even firmer coupling.

The terminal 400 in the above-described structure does not require soldering on the conducting portion 230a of the second circuit board 230. Here, the conducting portion 230a may be plated with a tin, lead, gold, or silver metal alloy. Also, an electrically conductive material such as a compound film of high-density carbon fiber may be applied between the joining portion 430 of the terminal 400 and the conducting portion 230a to improve conductivity.

Furthermore, the elastic portion 420 of the terminal 400 is protected and guided by the inner wall of the supporting hole 310, so that when it is subjected to an excessive amount of compressing force or an external shock, the curved part of the elastic portion 420 can be supported by the supporting wall 320.

FIG. 5 is a perspective view of a terminal showing the joining portion 430 with a convexo-concave structure 430a formed thereon according to the first embodiment of the present invention.

Referring to FIG. 5, the contact between the joining portion 430 of the terminal 400 and the conducting portion 230a may be unevenly formed on the bottom surface of the joining portion, i.e., in a convexo-concave structure or an embossed structure, so that the joining structure is stronger.

Also, the upper surface of the second circuit board 230 may be formed in a convexo-concave or embossed structure to correspond to the bottom surface of the joining portion 430, for better joining.

The joining structure of the fixing ledge 330 and the fixing arm 224 may employ another type of mechanical joining method, for example, a rivet joining method.

FIG. 6 is a perspective view of a flat vibration motor according to the first embodiment of the present invention employing rivet connecting.

Referring to FIG. 6, the fixing mount 260 and the base portion 300 have a hole (B) formed in alignment therethrough from top to bottom, with a rivet (A) passing through the hole (B). That is, the rivet (A) is inserted through the hole (B) after the fixing mount 260, the second circuit board 230, the terminal 400, and the base portion 300 are joined in sequence. The end of the rivet (A) at the bottom of the fixing mount 260 is then processed to fasten the fixing mount 260 to the base portion 300.

In FIG. 6, rivet coupling is used to achieve the coupling of the base portion 300 and the fixing mount 260; however, a screw or bolt and nut coupling may easily be substituted.

The flat vibration motor according to the first embodiment of the present invention employs a mechanical joining structure to securely connect the terminal and the circuit board without the use of solder (which can cause deformation of the base portion, contact failure, environmental pollution, and other adverse effects of soldering).

Also, the joining structure according to the first embodiment of the present invention reduces manufacturing cost and increases assembling efficiency of the base portion, the terminal, and the stator portion.

Second Embodiment

A detailed description of the joining structure of the base portion 300', the terminal 400', and the stator portion 200' according to the second embodiment of the present invention will be given below with reference to the diagrams.

FIG. 7 is an exploded perspective view showing how the base portion 300', the terminals 400', and the stator portion 200' of a flat vibration motor according to the second embodiment of the present invention are assembled, and FIG. 8 is a perspective view showing the base portion 300' coupled with the terminals 400' of a flat vibration motor according to the second embodiment of the present invention.

Referring to FIGS. 7 and 8, the stator portion 200' forms a fixing mount 260 extending from a lower case of the stator portion 200'. The fixing mount 260 is a rectangular plate and has a second circuit board 230 fixed thereabove.

The terminal 400' includes a contacting portion 410, an elastic portion 420, and a joining portion 430'. Two terminals 400' are arranged in mutual opposition on the second circuit board 230.

The joining portion 430' is coupled to a conducting portion 230a of the second circuit board 230 through soldering, and the contacting portion 410 contacts an electrical terminal of a mobile telecommunication terminal, from which it receives electricity.

The elastic portion 420 is formed between the contacting portion 410 and the joining portion 430' to provide elasticity, and has a depressed middle.

When the contacting portion 410 of the terminal 400' contacts a power terminal of a mobile telecommunication terminal, the contacting force elastically contracts the elastic portion 420. The tensility of the latter maintains the contact.

The base portion 300' has a supporting hole 310 formed respectively for inserting each terminal 400', with a supporting wall 320 provided between two supporting holes 310. The supporting wall 320 may be integrally formed with the main body of the base portion 300'.

Also, as shown in FIG. 7, a flat vibration motor according to the second embodiment of the present invention may include a fixing ledge 330 formed on each side of the base portion 300', and a fixing arm 224 formed on either side of the fixing mount 260 to oppose the fixing ledge 330.

Although the numbers and shapes of the fixing ledge 330 and the fixing arm 224 may vary, in the second embodiment, one of each is formed at either side of the base portion 300' and the fixing mount 260 in a rectangular shape.

A second circuit board 230, a terminal 400', and a base portion 300' are sequentially disposed on the fixing portion 260, and the end portion of the fixing arm 224 may be permanently bent upwards towards the top of the fixing ledge 330, in order to firmly fix the base portion 300' and the fixing mount 260.

The flat vibration motor according to the second embodiment of the present invention may form the supporting holes 310 in duplicate or in an alternate number to coincide with the number of terminals 400' provided.

The supporting hole 310 in the second embodiment may be formed in a rectangular shape, or in a shape with its middle portions concaving inward to improve the coupling with the terminal 400' inserted therein.

The structure of the supporting hole 310 allows the elastic portion 420 of the terminal 400' to be firmly supported by the supporting wall 320 that is the inner wall of the supporting hole 310.

The elastic portion 420 is disposed within the supporting hole 310, the contacting portion 410 is exposed towards the top of the supporting hole 310 to contact a power terminal of a mobile telecommunication terminal, and the joining portion 430' is exposed at the bottom to join with the second circuit board 230.

The joining portion 430' of the terminal 400' in the second embodiment may be widely formed for better contact with the second circuit board 230.

The elastic portion 420 of the terminal 400' in the above structure is protected by the inner walls of the supporting hole 310, so that its curved part can be supported by the supporting wall 320 in the event of being subjected to excessive compression or a lateral shock.

Also, the elastic portion 420 retains a degree of movement to maintain a secure contact with an external power terminal. The size of the supporting hole 310 and the height of the supporting wall 320 may be adjusted so that the elastic portion 420 can be supported by the supporting wall 320 if it is excessively compressed.

The supporting wall 320 may be formed to be the same height or higher than the elastic portion 420 of the terminal 400', so that the terminal 400' may be firmly supported.

A flat vibration motor according to the second embodiment of the present invention supports its terminal with the inner wall of a supporting hole and guides the terminal in only a vertical direction to allow for compression and decompression to reliably maintain the contacting position of the terminal, so that wobbling or deformation of the terminal is prevented when the terminal is subjected to lateral pressure or shock or excessive compression.

The flat vibration motor according to the second embodiment also maintains a consistent distance between terminals and between the center of the motor and a terminal.

Furthermore, by supporting a terminal before it reaches a changing point in its elasticity, the flat vibration motor according to the second embodiment prevents deformation of the terminal due to excessive compression thereof when in contact with an external terminal, so that a contact point is reliably maintained.

Third Embodiment

FIG. 9 is an exploded perspective view showing how the base portion 300", the terminals 400", and the stator portion 200 of a flat vibration motor according to the third embodiment of the present invention are assembled.

Referring to FIG. 9, in a stator portion 200 including an upper case 210 and a lower case 220, the lower case 220 has a fixing mount 260 formed at a side thereof, where the fixing mount 260 is a rectangular plate supporting the bottom of the base portion 300" and has a second circuit board 230 above it.

The terminal 400" of the flat vibration motor according to the third embodiment includes a contacting portion 410, an elastic portion 420", and a joining portion 430", and is provided in mutual opposition on the fixing mount 260.

The terminal 400" is provided in duplicate in the third embodiment, but may be provided in an alternate number.

The joining portion 430" may be connected through soldering to a portion of the second circuit board 230, and the contacting portion 410 contacts a power terminal of a mobile telecommunication terminal.

The joining portion 430" has a portion on either side thereof protruding outward to provide a larger surface area for a firmer joining between the base portion 300" and the second circuit board 230, and also for easier soldering with the second circuit board 230.

The elastic portion 420" is formed between the contacting and joining portions 410 and 430", and provides elasticity. Thus, the terminal 400" may be formed of a tensile metal. In order to retain its degree of elasticity, the elastic portion 420" is formed in a winding structure. The contacting portion 410 contacts an external power terminal and maintains a reliable contacting point through the elasticity of the elastic portion 420".

A stepped space 390 is formed on the base portion 300" in a region where the joining portion 430" of the terminal 400" occupies. The stepped space 390 has a size conforming to the joining portion 430", and the joining portion 430" is fixed so that it does not move. The stepped space 390 may be opened at its outer end.

The joining portion 430" and the stepped space 390 according to the third embodiment of the present invention are formed in a rectangular plate shape, but may adopt various other shapes and thicknesses.

The base portion 300" of the flat vibration motor may include a fixing ledge 330 formed respectively on either side thereof, and a fixing arm 224 may be formed respectively on either side of the fixing mount 260 opposite to the fixing ledge 330, as shown in FIG. 9.

Here, the fixing ledge 330 and the fixing arm 224 may come in various numbers and shapes, although one of each are respectively provided on either side of the base portion 300" and the fixing mount 260, and they are both rectangularly shaped in the third embodiment.

FIG. 10 is a plan view and a vertical view showing the assembled base portion 300", terminals 400", and fixing mount 260 of a flat vibration motor according to the third embodiment of the present invention.

Referring to FIG. 10, when the base portion 300" is coupled to the fixing mount 260, a first portion 430"a of the joining portion 430 of the terminal 400" protruding inward is fixed to the fixing mount 260, and a second portion 430"b of the joining portion 430" protruding outward is exposed to the outside and coupled to the second circuit board 230 using solder 440.

In this structure, the base 300" is first coupled to the fixing mount 260 on a portion of the second circuit board 230, and the terminal 400" is pushed from the outside in through the open part of the base 300". Then, soldering is performed on the second circuit board 230.

When the second circuit board 230, the terminal 400", and the base portion 300" are sequentially positioned on the fixing mount 260, the end of the fixing arm 224 is bent upwards towards the top of the fixing ledge 330 to firmly couple the base portion 300" to the fixing mount 260.

FIG. 11 is an enlarged side view showing how the base portion 300", a terminal 400", and a fixing mount 260 of a flat vibration motor according to the third embodiment of the present invention are assembled.

Referring to FIG. 11, the base portion 300" includes the same coupling structure of the stepped space 390 and joining portion 430" as in the previous example of the third embodiment.

However, the base portion 300" forms a second stepped space 390a occupied by a horizontal part 420"a that runs parallel to the bottom of the bending elastic portion 420".

That is, the lower part 340 of the base portion 300" is formed up to the bottom surface of the horizontal portion 420"a, and a structure 350 disposed above the top surface of the horizontal part 420"a forms a second stepped space 390a together with the lower part 340 of the base portion 300".

The joining portion 430" and the first horizontal part 420"a are fixed and supported through this structure of the base portion 300", to reduce the possibility of being displaced or deformed by a load exerted by an external terminal.

FIG. 12 is a further enlarged side view showing another assembling structure of the base portion 300", a terminal 400", and a fixing mount 260 of a flat vibration motor according to the third embodiment of the present invention are assembled.

Referring to FIG. 12, the altered assembly of the base portion 300", the terminal 400", and the fixing mount 260" is basically the same as the preceding third embodiment.

However, the stepped space 390 of the base portion 300" has a concaved part 312b concaved upward, and the joining portion 430" has a convexed portion 432b formed in a central portion from either side thereof to fit into the concaved portion 312b.

Thus, if the terminal 400" is forcefully inserted into the base portion 300", the convexed portion 432b and concaved portion 312b are tightly pressed together. Likewise, a portion of the joining portion 430" that is exposed to the outside may be electrically coupled to the second circuit board 230 through soldering.

The flat vibration motor according to the third embodiment of the present invention allows easy assembly of the base portion, terminal, and stator to simplify the assembly process, reduce cost, and increase production.

INDUSTRIAL APPLICABILITY

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

The invention claimed is:

1. A flat vibration motor comprising:
   a rotor portion for generating vibrating force when rotating;
   a stator portion housing and coupled with the rotor portion to allow the rotor portion to rotate, wherein the stator portion transmits electricity to the rotor portion;
   a fixing mount extending from a side of a lower case of the stator portion for supporting a part of a circuit board thereon;
   at least one terminal, each terminal including:
      a contacting portion for contacting with an external terminal,
      an elastic portion for providing elasticity to the contacting portion, and
      a joining portion formed wider than the contacting portion and the elastic portion for electrically connecting to the circuit board; and
   a base portion including supporting holes corresponding to the at least one terminal, wherein a peripheral lower surface of the base portion adjacent to the supporting holes rests on an end portion of the joining portion such that the contacting portion and the elastic portion pass through the supporting holes, and wherein the base portion couples to the fixing mount and the stator portion.

2. The flat vibration motor according to claim 1, further comprising a coupling structure for mechanically coupling the base portion and the fixing mount,
   wherein the coupling structure includes at least one fixing arm on either side of the fixing mount and at least one fixing groove having a fixing ledge on either side of the base portion for coupling with the fixing arm.

3. The flat vibration motor according to claim 1, further comprising a coupling structure for mechanically coupling the base portion and the fixing mount, and
   further comprising a hole formed through the joining portion of the terminal, the fixing mount, and the base portion, wherein the coupling structure passes through the hole and is riveted.

4. The flat vibration motor according to claim 1, further comprising a coupling structure for mechanically coupling the base portion and the fix mount,
   wherein the coupling structure includes a hole passing through the fixing mount and the base portion in a single column from a top surface through to a bottom surface thereof, and a rivet for coupling with the hole.

5. The flat vibration motor according to claim 1, wherein the joining portion includes a concave-convex structure on a bottom surface thereof, and the circuit board includes a matching pair with the concave-convex structure for pressing against the joining portion.

6. The flat vibration motor according to claim 1, further comprising an adhesive applied to an area where the base portion couples to the stator portion.

7. The flat vibration motor according to claim 1, wherein one inner wall of the supporting hole has different height from another inner wall thereof.

8. The flat vibration motor according to claim 1, wherein the supporting holes are separated by an inner wall for supporting the terminals.

9. A flat vibration motor comprising:
   a rotor portion for generating vibrating force when rotating;
   a stator portion housing and coupled with the rotor portion for allowing the rotor portion to rotate, wherein the stator portion transmits electricity to the rotor portion;
   a fixing mount extended from a side of a lower case of the stator portion for supporting a part of a circuit board thereon;
   at least one terminal, each terminal including:
      a joining portion electrically connected to a portion of the circuit board,
      a contacting portion for contacting with an external terminal, and
      an elastic portion formed between the contacting portion and the joining portion for providing elasticity; and
   a base portion coupled to the fixing mount and the stator portion, the base portion including supporting holes, each supporting hole formed for guiding an elastic deformation of the respective terminal;
   wherein in the fixing mount comprises at least one fixing arm formed at either thereof, and wherein the base portion comprises at least one fixing groove having a fixing ledge formed on either side thereof for coupling to the fixing arm to mechanically couple the base portion with the fixing mount.

10. The flat vibration motor according to claim 9, wherein the joining portion is formed larger than the supporting hole and is fixed by a periphery around the supporting hole at a bottom of the base portion.

11. The flat vibration motor according to claim 9, wherein the elastic portion has a bent part, and wherein a supporting wall between two supporting holes is equal to or higher than the bent part.

12. The flat vibration motor according to claim 9, wherein the supporting holes are separated by an inner wall for supporting the terminals.

13. A flat vibration motor comprising:
   a rotor portion for generating vibrating force when rotating;
   a stator portion coupled with the rotor portion for allowing the rotor portion to rotate, wherein the stator portion transmits electricity to the rotor portion;
   a fixing mount extended from a side of a lower case of the stator portion for supporting a part of a circuit board thereon;

a terminal including:

a joining portion coupled to the circuit board, a contacting portion for contacting with an external terminal, and an elastic portion formed between the contacting portion and the joining portion for providing elasticity; and a base portion coupled with the fixing mount and the stator portion, and supporting the terminal, wherein the base portion includes a stepped space for inserting at least a part of the joining portion therein, and wherein the inserted joining portion is soldered to the circuit board;

wherein the circuit board comprises two conducting portion, and wherein a portion of the base portion positioned the two conducting portions is contacted with the two conducting portions.

14. The flat vibration motor according to claim 13, wherein the fixing mount includes at least one fixing arm formed on either side thereof, and the base portion includes at least one fixing groove having fixing ledge formed on either side thereof for coupling with the fixing arm, to mechanically couple the base portion with the fixing mount.

15. The flat vibration motor according to claim 13, wherein the joining portion has extended ends, and wherein one of the extended ends inserts into the stepped space and contacts with the base portion.

16. The flat vibration motor according to claim 13, wherein the elastic portion has at least two bends with at least three horizontal parts.

17. The flat vibration motor according to claim 13, wherein the joining portion includes an outwardly-exposed part thereof that is soldered and electrically coupled to the circuit board.

18. The flat vibration motor according to claim 13, wherein the stepped space includes a concave-convex structure on inner surface thereof, and the terminal includes a corresponding concave-convex structure for pairing with the concave-convex structure of the stepped space.

19. The flat vibration motor according to claim 2, wherein the at least one fixing arm is vertically extended from the fixing mount.

20. The flat vibration motor according to claim 9, wherein the at least one fixing arm is vertically extended from the fixing mount.

* * * * *